US008249272B2

(12) United States Patent
Chen et al.

(10) Patent No.: US 8,249,272 B2
(45) Date of Patent: Aug. 21, 2012

(54) AUDIO PLAYBACK APPARATUS

(75) Inventors: Ming-Hsiung Chen, Taipei (TW); Shang-Shu Chung, Taipei (TW); Ming-Chung Li, Taipei (TW)

(73) Assignee: Princeton Technology Corporation, Hsin Tien, Taipei County (TW)

( * ) Notice: Subject to any disclaimer, the term of this patent is extended or adjusted under 35 U.S.C. 154(b) by 1140 days.

(21) Appl. No.: 12/117,212

(22) Filed: May 8, 2008

(65) Prior Publication Data

US 2009/0154731 A1 Jun. 18, 2009

(30) Foreign Application Priority Data

Dec. 18, 2007 (TW) .............................. 96221524 U

(51) Int. Cl.
*H04B 15/00* (2006.01)

(52) U.S. Cl. .......................... 381/94.1; 381/120; 381/58

(58) Field of Classification Search ........................ None
See application file for complete search history.

(56) References Cited

U.S. PATENT DOCUMENTS

2003/0185400 A1* 10/2003 Yoshizawa et al. ............. 381/58
2006/0171545 A1* 8/2006 Lin et al. .......................... 381/77
2006/0285700 A1* 12/2006 Felder et al. ................ 381/94.5

* cited by examiner

*Primary Examiner* — Steven J Fulk
(74) *Attorney, Agent, or Firm* — Muncy, Geissler, Olds & Lowe, PLLC

(57) ABSTRACT

An audio playback apparatus is disclosed. The audio playback apparatus processes an audio signal and provides at least one output signal to at least one speaker or an earphone connected to a phone-jack. The audio playback apparatus comprises a clock generating module, a processing module, an amplifier module, and a detecting module. The processing module is connected to the clock generating module and processes the audio signal to generate a processed signal according to a clock signal generated by the clock generating module. The amplifier module amplifies the processed signal to generate an output signal. The detecting module detects whether the earphone is plugged in the phone-jack. If the earphone is plugged in the phone-jack, the amplifier module provides the output signal to the earphone. If not, the amplifier module provides the output signal to the speaker.

12 Claims, 3 Drawing Sheets

AUDIO PLAYBACK APPARATUS

BACKGROUND OF THE INVENTION

1. Field of the Invention

The invention relates to an audio playback apparatus and, in particular, to an audio playback system switching between a speaker and an earphone.

2. Description of the Related Art

An audio amplifer is typically implemented with a D-type amplifier. A convnetional AB-type amplifier genereates a linear signal while a D-type amplifier genenrates a pluse width modulation (PWM) signal comprising a audio aignal and a PWM switching signal along with harmonics thereof. When the D-type amplifier operates, an output MOSFET thereof switches to a extremely low impedance state from a extremely high impedance state. Since the D-type amplifier stays in an active region only for a few nano seconds, output power consumption thereof is much lower than an AB-type amplifier. Such effective power amplification and conversion result in lower electrical power consumption and provide more applications such that a D-type amplifier has become a mainstream.

How to let a user selects a speaker or an earphone to play an audio signal processed by a D-type audio amplifier such that there is no intereference between the speaker and the earphone has bocome an important issue of D-type audio amplifier development. Accordingly, it is necessary to provide an audio playback apparatus capable of detecting whether a back-end output module is a speaker or an earphone and switching to the same to play the audio signal.

BRIEF SUMMARY OF THE INVENTION

An embodiment of an audio playback apparatus processes an audio signal and provides at least one output signal to at least one speaker or an earphone connected to a phone-jack. The audio playback apparatus comprises a clock generating module, a processing module, an amplifier module, and a detecting module. The processing module is connected to the clock generating module and processes the audio signal to generate a processed signal according to a clock signal generated by the clock generating module. The amplifier module amplifies the processed signal to generate an output signal. The detecting module detects whether the earphone is plugged in the phone-jack. If the earphone is plugged in the phone-jack, the amplifier module provides the output signal to the earphone. If not, the amplifier module provides the output signal to the speaker.

The invention provides an audio playback apparatus capable of switching between a speaker and an earphone. The audio playback apparatus of the invention significantly improves signal to noise ratio of an earphone.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is the best-contemplated mode of carrying out the invention. This description is made for the purpose of illustrating the general principles of the invention and should not be taken in a limiting sense. The scope of the invention is best determined by reference to the appended claims.

Figure 1:
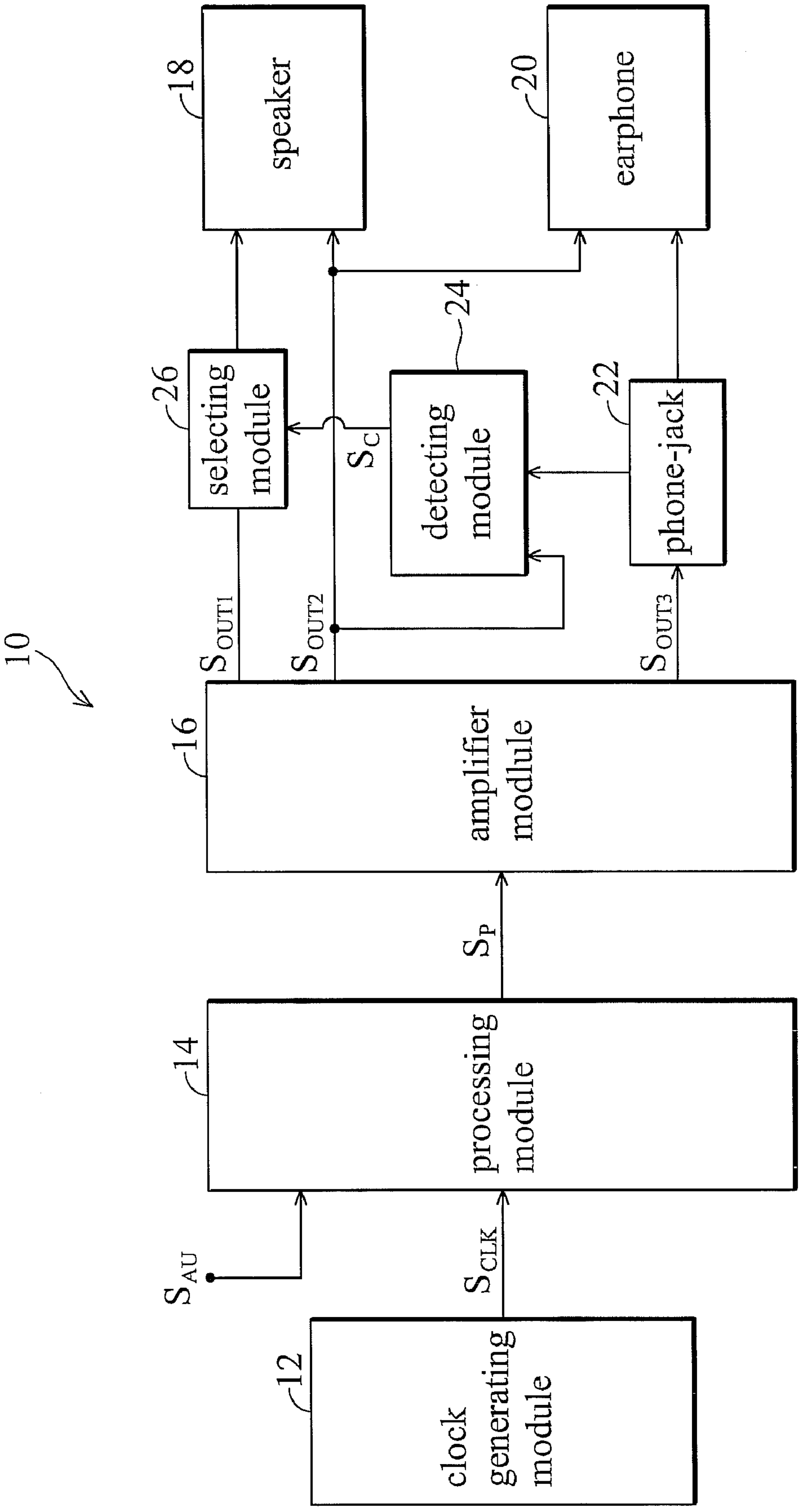
FIG. 1 is a schematic diagram of an audio playback apparatus according to an embodiment of the invention.

FIG. 1 is a schematic diagram of an audio playback apparatus according to an embodiment of the invention. As shown FIG. 1, the embodiments discloses an audio playback apparatus for processing an audio signal $S_{AU}$, and providing at least one output signal $S_{OUT1}$~$S_{OUT3}$ to at least one speaker or an earphone 20 plugged in a phone-jack 22. The audio playback apparatus 10 comprises a clock generating module 12, at least one processing module 14, at least one amplifier module 16 and at least one detecting module 24. The clock generating module 12 generates a clock signal $S_{CLK}$. At least one processing module 14 is coupled to the clock generating module 12 and performs processing to the audio signal $S_{AU}$ according to the clock signal $S_{CLK}$ to generate at least one processed signal $S_P$. At least one amplifier module 16 is coupled to at least one processing module 14 to amplify at lest one processed signal $S_P$ to generate at least one output signal $S_{OUT1}$~$S_{OUT3}$. At least one detecting module 24 is coupled to at least one amplifier module 16, at least one speaker 18 and the phone-jack 22 to detect whether an earphone 20 is plugged in the phone-jack 22. If the earphone 20 is plugged in the phone-jack 22, at least one amplifier module 16 provides at least one output signal $S_{OUT2}$/$S_{OUT3}$ to the earphone 20. If not, at least one amplifier module 16 provides at least one output signal $S_{OUT1}$/$S_{OUT2}$ to the speaker 18.

Figure 2:
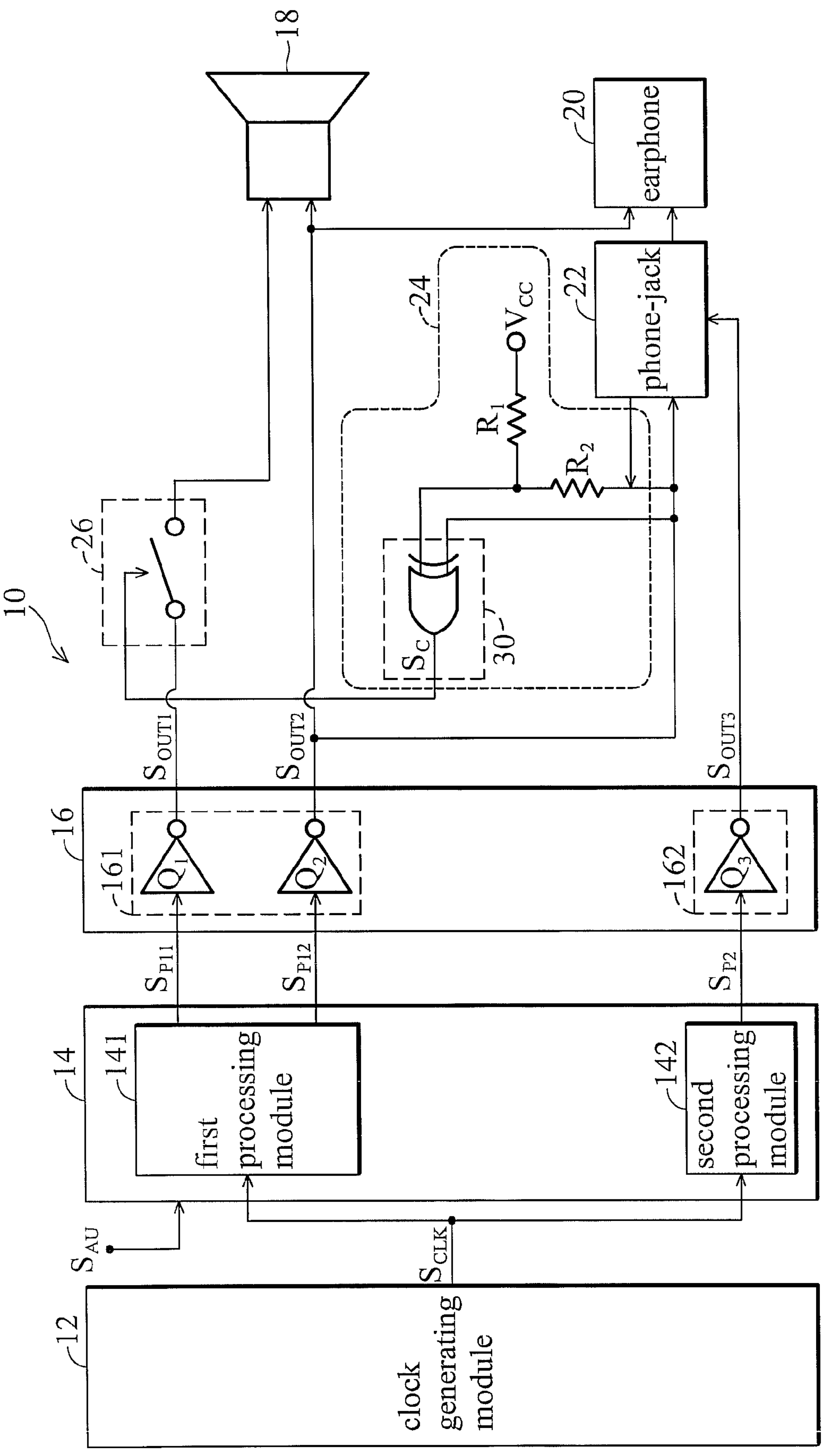
FIG. 2 is a schematic diagram of a detecting module of an audio playback apparatus according to an embodiment of the invention.

FIG. 2 is a schematic diagram of a detecting module of an audio playback apparatus according to an embodiment of the invention. As shown in FIG. 2, each of at least one detecting module 24 comprises a voltage source $V_{CC}$, a first resistor $R_1$, a second resistor $R_2$, and a logic unit 30. The first $R_1$ is coupled to the voltage source $V_{CC}$. One terminal of the second resistor $R_2$ is coupled to the first resistor $R_1$ and the other terminal of the second resistor $R_2$ is coupled between the phone-jack 22 and a first second amplifier $Q_2$. The logic unit 30 comprises a first input terminal, a second input terminal, and an output terminal. The first input terminal is coupled to the first resistor $R_1$ and the second resistor $R_2$. The second input terminal is coupled to at least one amplifier module 16. The logic unit 30 performs logic computation according to the signals inputted to the first and second input terminals and generates at least one control signal $S_C$ accordingly. In one embodiment, the logic unit 30 is an exclusive-or (XOR) gate.

The audio playback apparatus 10 comprises at least one selecting module 26 coupled between at least one speaker 18 and at least one amplifier module 16. The selecting module 26 provides at lest one amplified signal $S_{OUT1}$~$S_{OUT3}$ to at least one speaker 18 or the earphone 20 according to at least one control signal $S_C$. In an embodiment, at least one selecting module 26 is a switch.

At least one processing module 14 comprises a first processing module 141 and a second processing module 142. The first processing module 141 performs processing to the audio signal $S_{AU}$ according to the clock signal $S_{CLK}$ to generate a first first processed signal $S_{P11}$ and a first second processed signal $S_{P112}$. The second processing module 142 performs processing to the audio signal $S_{AU}$ according to the clock signal $S_{CLK}$ to generate a second processed signal $S_{P2}$.

At least one amplifier module comprises a first amplifier module 161 and a second amplifier module 162. The first amplifier module 161 is coupled to the first processing module 141, at least one speaker 18 and the phone-jack 22 and amplifies the first first processed signal $S_{P11}$ and the first second processed signal $S_{P112}$ to generate a first first output signal $S_{OUT1}$ and a first second output signal $S_{OUT2}$. The second amplifier module 162 is coupled to the second processing module 142 and the phone-jack 22 and amplifies the second processed signal $S_{P2}$ to generate a second output signal $S_{OUT2}$.

In addition, the first amplifier module 161 comprises a first first amplifier $Q_1$ and a first second amplifier $Q_2$. The second amplifier module 162 comprises an amplifier $Q_3$. The first first amplifier $Q_1$ is coupled to the first processing module 141 and at least one speaker 18 to amplify the first first processed signal $S_{P11}$ to generate the first first output signal $S_{OUT1}$. The first second amplifier $Q_2$ is coupled to the first processing module 141, at least one speaker 18, and the phone-jack 22 to amplify the first second processed signal $S_{P112}$ to generate the first first output signal $S_{OUT2}$. In an embodiment, the first first amplifier $Q_1$ and the first second amplifier $Q_2$ are MOSFETs. The second input terminal of the logic unit 30 is coupled to the first second amplifier $Q_2$ such that input signals inputted to the first and second input terminals are logically computed and a control signal $S_C$ is generated accordingly.

At least one selecting module 26 is coupled between the first first amplifier $Q_1$ and at least one speaker 18 to selectively provide the first first output signal $S_{OUT1}$ to at least one speaker 18. When the selecting module 26 is conductive, the first first amplifier $Q_1$ and the first second amplifier $Q_2$ respectively provide the first first output signal $S_{OUT1}$ and the first second output signal $S_{OUT2}$ to at least one speaker 18. When the selecting module 26 is disconnected, the first second amplifier $Q_1$ and the second amplifier $Q_2$ respectively provide the first second output signal $S_{OUT2}$ and the second output signal $S_{OUT3}$ to the phone-jack 22.

Figure 3:
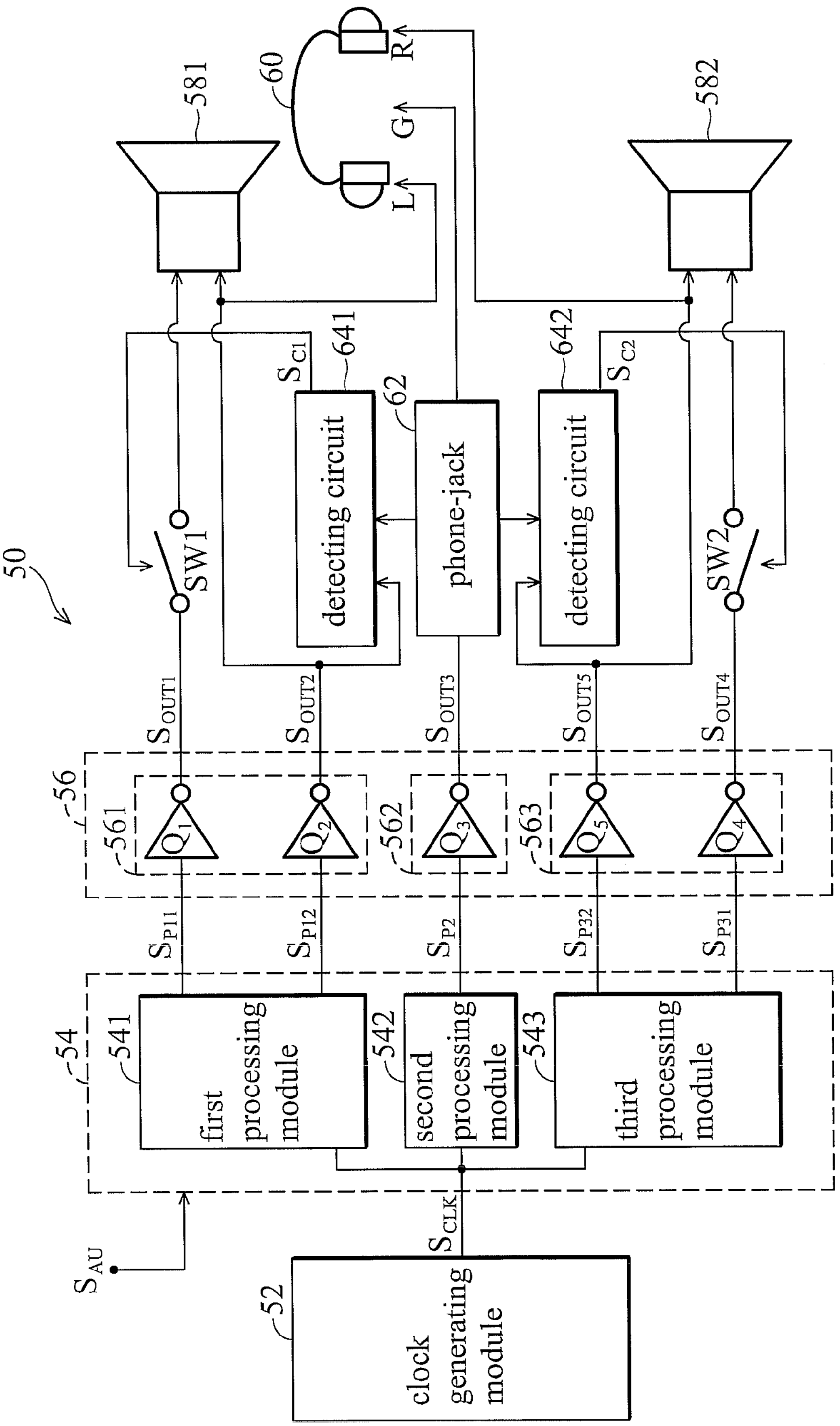
FIG. 3 is a schematic diagram of an audio playback apparatus according to another embodiment of the invention.

FIG. 3 is a schematic diagram of an audio playback apparatus according to another embodiment of the invention. As shown FIG. 3, amplifiers $Q_1$ and $Q_2$ of the first amplifier 561 and amplifiers $Q_4$ and $Q_5$ of the third amplifier 561 collectively form a bridge output to push speakers 581 and 582 of different channels. When no signal is inputted, output of the amplifiers $Q_1$, $Q_2$, $Q_4$ and $Q_5$ are identical square waves such that power consumption on loadings of the speakers 181 and 182 is reduced. When the earphone 60 is plugged in the phone-jack 62, detecting circuits 641 and 642 detect and generate control signals $S_{C1}$ and $S_{C2}$ such that the selecting modules SW1 and SW2 are disconnected. As a result, the speakers 581 and 582 are disconnected form the amplifiers $Q_1$ and $Q_4$. In the embodiment, the selecting modules SW1 and SW2 are implemented with switches.

When the earphone 60 is plugged in the phone-jack, the audio playback apparatus 50 drives the earphone 60 via the amplifiers $Q_2$ and $Q_5$. Since the earphone 60 is typically 3-wire connected, it cannot be driven by BTL bridge and needs to be driven by single terminal. Thus, the common ground G of the earphone 60 is connected to the amplifier $Q_3$ and a difference between the square waves of the amplifiers $Q_2$ and $Q_5$ and the amplifier $Q_3$ is transmitted to the earphone 60 and converted to audio output.

When the speakers 581 and 582 operate, the amplifier $Q_3$ outputs a square wave of the same frequency as the clock signal $S_{CLK}$. The output waveform of the square wave is synchronous with the clock signal $S_{CLK}$ and is not influenced by external signals. When the processing module 54 operates, the clock signal $S_{CLK}$ is interfered and clock jitter is generated such that signal to noise ratio of the output signal of the earphone degrades. If the clock signal with clock jitter is added to the common ground G of the earphone 60 via the amplifier $Q_3$, common mode cancellation is accomplished on the loading of the earphone 60. As a result, signal to noise ratio of the earphone 60 is significantly improved.

In embodiments of the invention, the audio playback apparatus is provided with a dual-channel speaker and an earphone. When the earphone is plugged in the phone-jack, the audio playback apparatus switches an audio output interface automatically from the dual-channel speaker to the earphone. Thus, the audio playback apparatus is more user-friendly. In addition, signal to noise ratio of the audio playback apparatus is also significantly improved.

While the invention has been described by way of example and in terms of preferred embodiment, it is to be understood that the invention is not limited thereto. To the contrary, it is intended to cover various modifications and similar arrangements as would be apparent to those skilled in the Art. Therefore, the scope of the appended claims should be accorded the broadest interpretation so as to encompass all such modifications and similar arrangements.

What is claimed is:

1. An audio playback apparatus processing an audio signal, providing an output signal to a speaker or an earphone connected to a phone-jack, and comprising:

a clock generating module generating a clock signal;

a processing module coupled to the clock generating module, processing the audio signal to generate a processed signal according to a clock signal generated by the clock generating module;

an amplifier module coupled to the processing module and amplifying the processed signal to generate an output signal;

a detecting module coupled to the amplifier module, the speaker, and the phone-jack to detect whether the earphone is plugged in the phone-jack;

wherein if the earphone is plugged in the phone-jack, the amplifier module provides the output signal to the earphone, and if not, the amplifier module provides the output signal to the speaker; and wherein the detecting module comprises a voltage source, a first resistor coupled to the voltage source, a second resistor coupled to the first resistor and the phone-jack, and a logic unit comprising a first input terminal, a second input terminal and an output terminal, wherein the first input terminal is coupled to the first and second resistors, the second input terminal is coupled to the amplifier module, and the logic unit performs logic computation according to input signals from the first and second input terminals and generates a control signal at the output terminal based on the logic computation.

2. The audio playback apparatus as claimed in claim 1, wherein the logic unit is an exclusive-or (XOR) gate.

3. The audio playback apparatus as claimed in claim 1, further comprises a selecting module coupled between the speaker and the amplifier module to provide an amplified signal to the speaker or the earphone according to the control signal.

4. The audio playback apparatus as claimed in claim 3, wherein the selecting module is a switch.

5. The audio playback apparatus as claimed in claim 1, wherein the processing module comprises a first processing module processing the audio signal according to the clock signal and generating first and second processed signals and a second processing module processing the audio signal according to the clock signal and generating a second processed signal.

6. The audio playback apparatus as claimed in claim 5, wherein the amplifier module comprises a first amplifier module coupled to the first processing module, the speaker and the phone-jack such that the first and second processed signals are amplified and first first and first second output signals are generated correspondingly, and a second amplifier module coupled to the second processing module and the phone-jack to generated a second output signal.

7. The audio playback apparatus as claimed in claim 6, wherein the first amplifier module comprises a first first amplifier coupled to the first processing module and the speaker such that the first processed signal is amplified to generate the first first output signal, and a second amplifier coupled to the first processing module, the speaker and the phone-jack such that the first second processed signal is amplified to generate the first second output signal.

8. The audio playback apparatus as claimed in claim 7, wherein the second terminal of the logic unit is coupled to the first second amplifier such that the input signals inputted to the first and second input terminals are logically computed and a control signal is generated accordingly.

9. The audio playback apparatus as claimed in claim 8, wherein the selecting module is coupled between the first first amplifier and the speaker and selectively provides the first first output signal to the speaker according to the control signal.

10. The audio playback apparatus as claimed in claim 9, wherein the first first amplifier and the first second amplifier respectively provides the first first output signal and the first second output signal to the speaker when the selecting module is conductive.

11. The audio playback apparatus as claimed in claim 10, wherein the first first amplifier and the first second amplifier respectively provides the first first output signal and the first second output signal to the phone-jack when the selecting module is disconnected.

12. The audio playback apparatus as claimed in claim 11, wherein the first first amplifier and the first second amplifier are MOSFETs.

* * * * *